(12) United States Patent
Tambasco

(10) Patent No.: US 11,698,491 B2
(45) Date of Patent: Jul. 11, 2023

(54) SIMULTANEOUS POLARIZATION SPLITTER ROTATOR

(71) Applicant: Cisco Technology, Inc., San Jose, CA (US)

(72) Inventor: Jean-Luc Joseph Tambasco, Macungie, PA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 6 days.

(21) Appl. No.: 17/387,432

(22) Filed: Jul. 28, 2021

(65) Prior Publication Data

US 2023/0029919 A1 Feb. 2, 2023

(51) Int. Cl.
G02B 6/126 (2006.01)
G02B 6/27 (2006.01)
G02B 6/12 (2006.01)

(52) U.S. Cl.
CPC ........... *G02B 6/2766* (2013.01); *G02B 6/126* (2013.01); *G02B 6/2773* (2013.01); *G02B 2006/12061* (2013.01)

(58) Field of Classification Search
CPC .................................................. G02B 6/29331
See application file for complete search history.

(56) References Cited

U.S. PATENT DOCUMENTS

| | | | | |
|---|---|---|---|---|
| 9,128,240 B2 * | 9/2015 | Hatori | ................. | G02B 6/1228 |
| 10,754,091 B1 * | 8/2020 | Nagarajan | ............. | G02B 6/428 |
| 2014/0270622 A1 * | 9/2014 | Barwicz | ................. | G02B 6/126 |
| | | | | 385/11 |
| 2016/0246005 A1 | 8/2016 | Liu et al. | | |
| 2017/0192174 A1 * | 7/2017 | Webster | ................... | G02B 6/12 |
| 2018/0149811 A1 * | 5/2018 | Park | ........................ | G02B 6/125 |
| 2018/0164505 A1 * | 6/2018 | Lin | ......................... | G02B 6/126 |
| 2019/0025506 A1 * | 1/2019 | Park | ...................... | G02B 6/1228 |
| 2019/0033520 A1 | 1/2019 | Lin et al. | | |

FOREIGN PATENT DOCUMENTS

CN 112269224 A 1/2021

OTHER PUBLICATIONS

Dominic F. Siriani, et al., Cisco Systems, "Adiabatic guided wave optics—a toolbox of generalized design and optimization methods", Optic Express, vol. 29, No. 3, 3243, Feb. 1, 2021, 15 pages.

(Continued)

*Primary Examiner* — Eric Wong (74) *Attorney, Agent, or Firm* — Edell, Shapiro & Finnan, LLC (57) ABSTRACT

A photonic polarization splitter rotator (PSR) includes a substrate, a first optical waveguide disposed in the substrate on a first layer, the first optical waveguide having a curved portion between a first end of the first optical waveguide and a second end of the first optical waveguide, and a second optical waveguide disposed in the substrate on a second layer, above the first layer, the second optical waveguide having a substantially rectangular shape and longitudinally arranged between the first end of the first optical waveguide and the second end of the first optical waveguide.

20 Claims, 11 Drawing Sheets

(56) References Cited

OTHER PUBLICATIONS

D M Shyroki, et al., "Dielectric multilayer waveguides for TE and TM mode matching", Journal of Optics A: Pure and Applied Optics, vol. 5, No. 3, Mar. 26, 13 pages.
X. Sun, et al., "Polarization rotator based on augmented low-index-guiding waveguide on silicon nitride/silicon-on-insulator platform", Optics Letters, vol. 41, No. 14, Jul. 15, 2016, 4 pages.
Wesley D. Sacher, et al., "Polarization rotator-splitters and controllers in a Si3N4-on-SOI integrated photonics platform", Optical Society of America, vol. 22, No. 9, May 1, 2014, 8 pages.
Daoxin Dai, et al., "Novel concept for ultracompact polarization splitter-rotator based on silicon nanowires", Optics Express, vol. 19, No. 11, https://www.osapublishing.org/oe/viewmedia.cfm?uri=oe-19-11-10940&seq=0, May 23, 2011, 10 pages.
Yunhong Ding, et al., "Wideband polarization splitter and rotator with large fabrication tolerance and simple fabrication process", Optical Society of America, vol. 38, No. 8, Apr. 15, 2013, 3 pages.
Kang Tan, et al., "Three-Dimensional Polarization Splitter and Rotator Based on Multi-Layer Si3N4-on-SOI Platform", IEEE, 2016 International Conference on Optical MEMS and Nanophotonics (OMN), 2016, 2 pages.

\* cited by examiner

SIMULTANEOUS POLARIZATION SPLITTER ROTATOR

TECHNICAL FIELD

Embodiments described herein are directed to a photonic polarization splitter rotator or "PSR."

BACKGROUND

For coherent transmission, dual polarization division multiplexing (DPDM) helps to increase the bandwidth of an optical fiber by a factor of two. DPDM Quadrature Phase Shift Keying (DP-QPSK) is one of the most important modulation mechanisms for long-haul coherent transmission. A polarization splitter and rotator (PSR) is one of the fundamental building blocks of a DP-QPSK transceiver. In order to launch two polarizations from a photonic integrated circuit (PIC) to an optical fiber, a PSR is configured to multiplex polarizations on the transmission (TX) side. A PSR can also be used in the opposite direction to de-multiplex polarizations at the receiver (RX) side to ensure the PIC receives only light of a single polarization on an appropriate waveguide.

More specifically, for a receiver and transmitter, a PSR transforms a single waveguide carrying both a transverse electric optical signal (TE0) and a transverse magnetic optical signal (TM0) into two isolated waveguides each carrying TE0. A high index contrast material is typically used to strongly break the optical symmetry of the waveguide, enabling polarization rotation (TM0→TE1). Typically, a modemux follows the rotation stage, converting TE1 into TE0 of an isolated waveguide. The rotator might have a length of about 120 um, and the modemux might have a length of about 100 um, for a total length of the two-component combination of about 200-220 um.

DESCRIPTION OF EXAMPLE EMBODIMENTS

Overview

Presented herein is a polarization splitter rotator (PSR) having three waveguide elements in a vertically stacked configuration. The PSR includes a substrate, a first optical waveguide disposed in the substrate on a first layer, the first optical waveguide having a curved portion between a first end of the first optical waveguide and a second end of the first optical waveguide, and a second optical waveguide disposed in the substrate on a second layer, above the first layer, the second optical waveguide having a substantially rectangular shape and longitudinally arranged between the first end of the first optical waveguide and the second end of the first optical waveguide. A third optical waveguide is disposed between the first and second optical waveguides.

In another embodiment, a PSR includes a substrate, a first optical waveguide disposed in the substrate on a first layer, the first optical waveguide arranged such that its position translates along an axis perpendicular to an axis extending between a first end of the first optical waveguide and a second end of the first optical waveguide, a second optical waveguide disposed in the substrate on a second layer, above the first layer, the second optical waveguide having a substantially rectangular shape and longitudinally arranged between first the end of the first optical waveguide and the second end of the first optical waveguide, and a third optical waveguide disposed in the substrate between the first optical waveguide and the second optical waveguide.

In still another embodiment, a method is provided. The method includes presenting light, from an optical fiber, at a first end of a SiN optical waveguide disposed in a substrate, causing the light to interact with a curved Si optical waveguide disposed in the substrate at least partially underneath the SiN optical waveguide, outputting a first optical signal on a second end of the SiN optical waveguide, and outputting a second optical signal at an end of the Si optical waveguide.

Example Embodiments

Described herein is a photonic component that both rotates and modemuxes at the same time by presenting light to one of two vertically stacked materials, arranged as optical waveguides. In embodiments described herein, a lower material of the vertically stacked materials is translated with respect to an upper material of the vertically stacked materials. The upper material does not include translation. A third material is disposed between the lower and upper materials. Polarization rotating is normally more sensitive than modemuxing, and thus more space is allocated to the rotating function. However, by modemuxing at the same time as rotating, the modemuxing operation is essentially 'free,' i.e., no additional or dedicated space is needed for this operation. Furthermore, modemuxing, in accordance with an embodiment, does not operate on TE1 (which is a costly operation). Instead, the modemuxing operation of the described embodiments strips TE0, a well-confined mode that can be rapidly manipulated. As will be explained below in detail, an embodiment described herein is arranged to translate a silicon (Si) layer in a substrate with respect to a fixed silicon nitride ($Si_3N_4$, or more simple herein "SiN") layer (with an intermediate poly-silicon layer), such that a rotation is induced at the same time that modemuxing is occurring.

Furthermore, in an embodiment, the disclosed rotator has a SiN input and a SiN output for the rotated TM0 mode. Such a configuration allows the device to operate as a compact TM0→TE0 high optical power handling rotator.

Notably, the disclosed PSR keeps the more lossy TM0→TE1 mode in the SiN, unlike other PSR topologies, which are configured to transition the lossy mode into Si, increasing polarization dependent loss (PDL).

Figure 1:
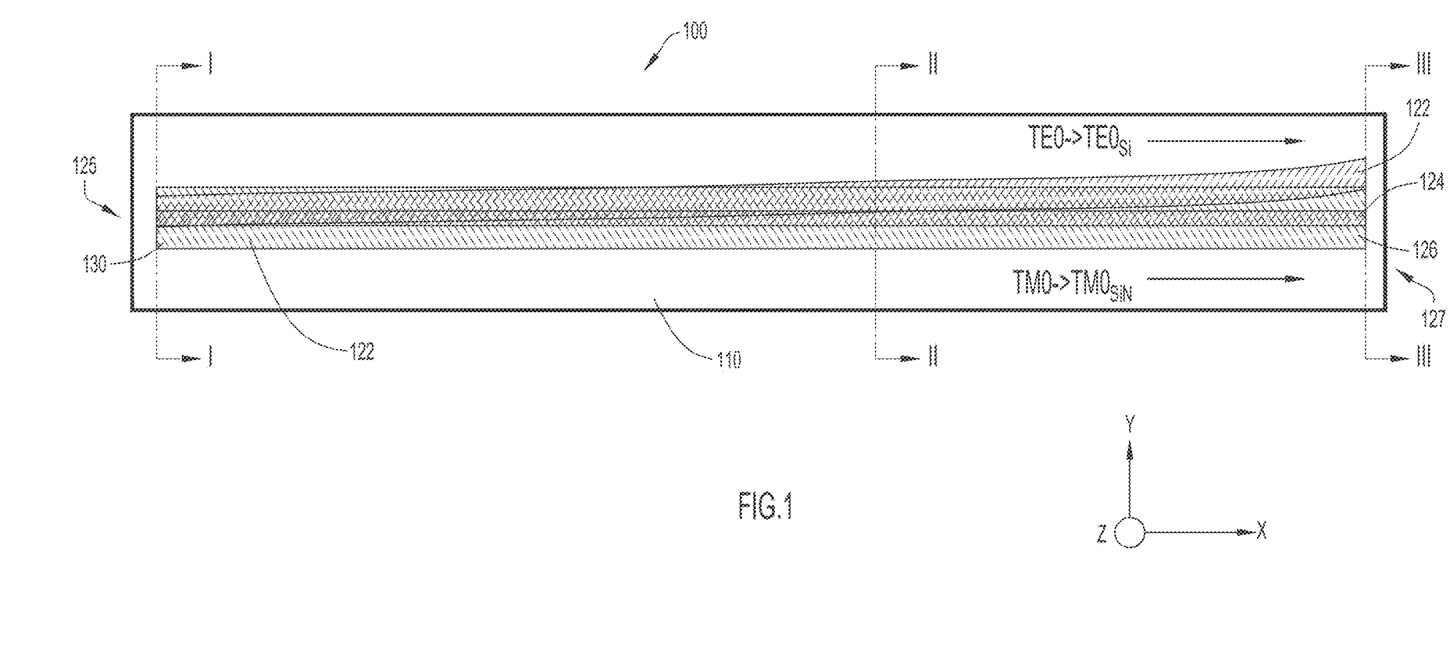
FIG. 1 shows a plan view of a polarization splitter rotator, according to an example embodiment.
Figure 2A:
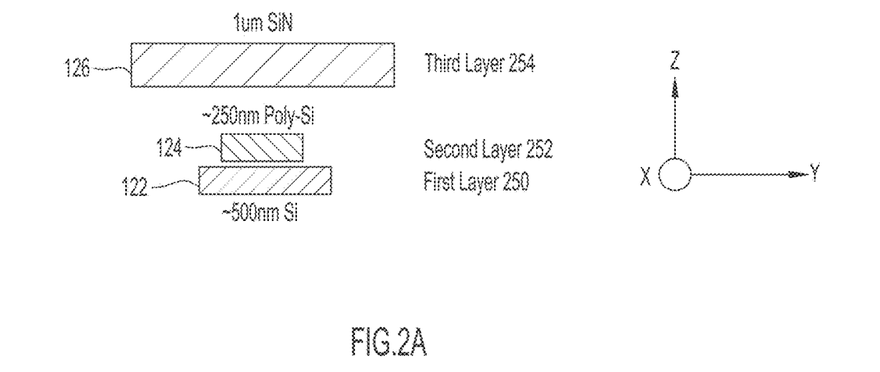
FIGS. 2A, 2B, and 2C show, respectively, cross-sectional views at I-I, II-II, III-III of FIG. 1, according to an example embodiment.
Figure 2B:
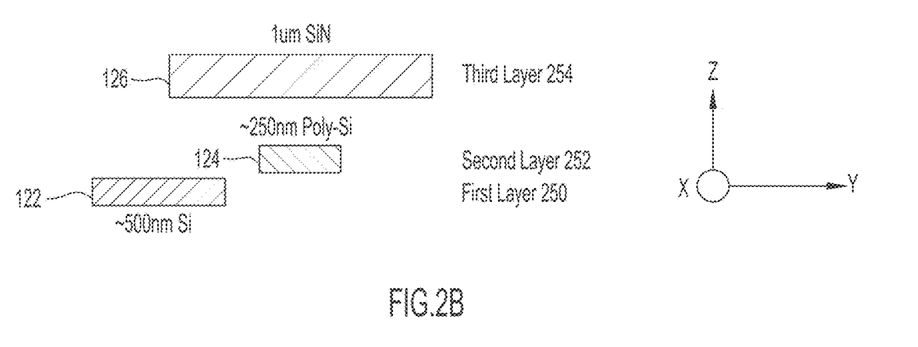
Figure 2C:
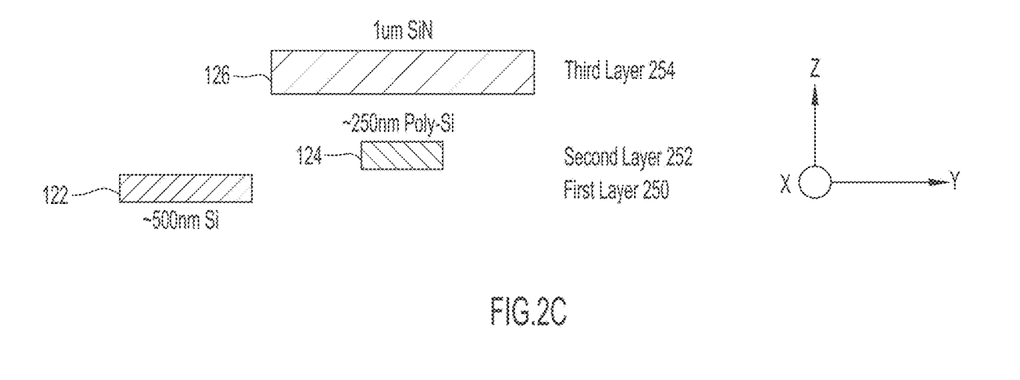

Reference is now made to the figures, beginning with FIG. 1, which shows a plan view of a polarization splitter rotator or PSR 100, according to an example embodiment, and with FIGS. 2A, 2B, and 2C, which show, respectively, cross-sectional views at I-I, II-II, III-III of FIG. 1, according to an example embodiment. PSR 100 is fabricated within/on a substrate 110 (e.g., $SiO_2$) and includes a first optical waveguide 122 that is disposed in substrate 110 on a first layer 250 (with layers disposed at different positions in a z-axis direction). The first optical waveguide 122 is disposed between a first end 125 having an input 130 of PSR 100 and a second end 127 of PSR 100. In an embodiment, the first optical waveguide 122 is comprised of Si, and has a substantially rectangular cross section. First optical waveguide 122 may have a width along the y-axis of about 500 nm, and a thickness in the z-axis direction of about 110 nm.

PSR 100 further includes a second optical waveguide 124 disposed in substrate 110 on a second layer 252, above the first layer 250. Second optical waveguide 124 may have a rectangular shape in plan view (FIG. 1) and has a substantially rectangular cross section. In an embodiment, second optical waveguide 124 is comprised of poly-silicon and may be about 250 nm wide along the y-axis, and may have a thickness in the z-axis direction of about 120 nm.

PSR 100 still further includes a third optical waveguide 126 that also may have a substantially rectangular shape in plan view (FIG. 1) and a substantially rectangular cross section. Third optical waveguide 126 is centered over the second optical waveguide 124 and disposed in a third layer 254 above second layer 252. In an embodiment, the third optical waveguide 126 is comprised of SiN, has a width along the y-axis of about rum, and a thickness in the z-axis direction of about 200 nm.

In an embodiment, a gap between first optical waveguide 122 and second optical waveguide 124 may be about 5 nm, and a gap between second optical waveguide 124 and third optical waveguide 126 may be about 170 nm. The overall length of PSR 100 from first end 125 to second end 127 is about 50 um. Those skilled in the art will appreciate that the measurement values described above and further below are meant only as examples, and should not be considered limiting.

Still with reference to FIG. 1 and FIGS. 2A, 2B, and 2C, first optical waveguide 122 is disposed in substrate 110 such that at first end 125 of PSR 100, first optical waveguide 122 is substantially fully beneath third optical waveguide 126, and, as first optical waveguide 122 extends along the x-axis towards the second end 127 of PSR 100, it is translated out from under third optical waveguide 126 in a y-axis direction. At the second end 127 of PSR 100, first optical waveguide 122 may no longer be underneath third optical waveguide 126 at all and, at positions between the first end 125 and the second end 127, first optical waveguide 122 may be only partially beneath third optical waveguide 126. In other words, first optical waveguide 122 is curved away from being underneath third optical waveguide 126. The precise shape of first optical waveguide 122 may be optimized according to Dominic F. Siriani and Jean-Luc Tambasco, "Adiabatic guided wave optics—a toolbox of generalized design and optimization methods," Opt. Express 29, 3243-3257 (2021).

Figure 3A:
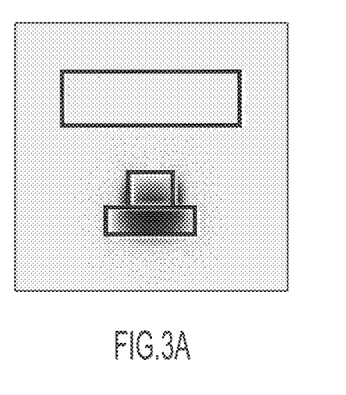
FIGS. 3A-3C show optical power of a TE0 to TE0$_{Si}$ signal in a y-z plane of a Si waveguide of the polarization splitter rotator, according to an example embodiment.
Figure 3B:
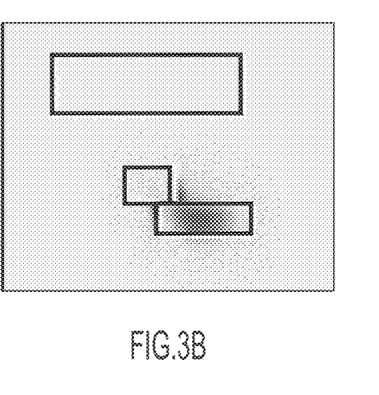
Figure 3C:
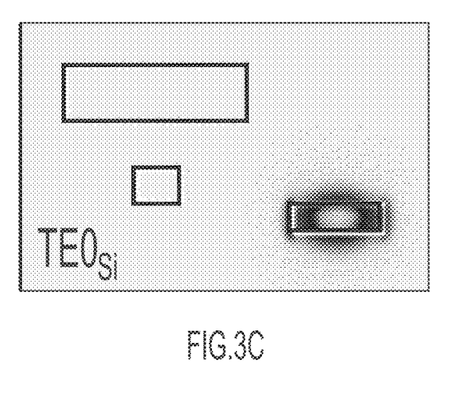

FIGS. 3A-3C show optical power of a TE0 signal in a y-z plane of first optical waveguide 122 of the polarization splitter rotator 100, according to an example embodiment. FIG. 3A shows the TE optical mode that has been transferred from the upper layer to the lower two layers. FIG. 3B shows the TE optical mode from FIG. 3A beginning to isolate itself to the lower layer. FIG. 3C shows the fully isolated TE polarized optical mode localized to the lower layer.

Figure 4A:
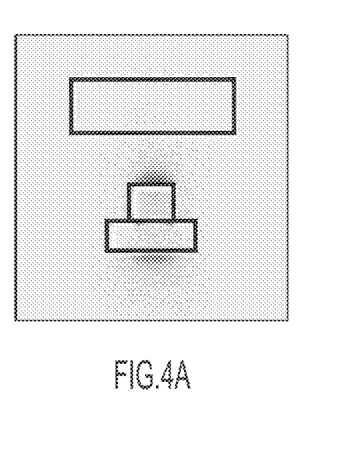
FIGS. 4A-4C show optical power of a TM0 to TE0$_{SiN}$ signal in a y-z plane of a SiN waveguide of the polarization splitter rotator, according to an example embodiment.
Figure 4B:
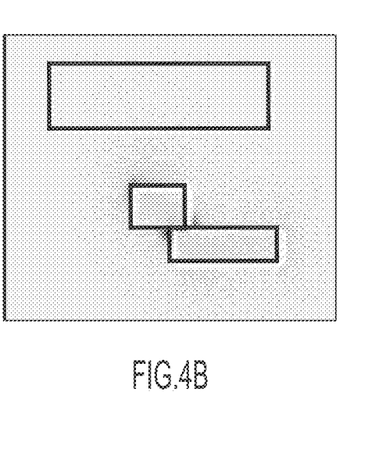
Figure 4C:
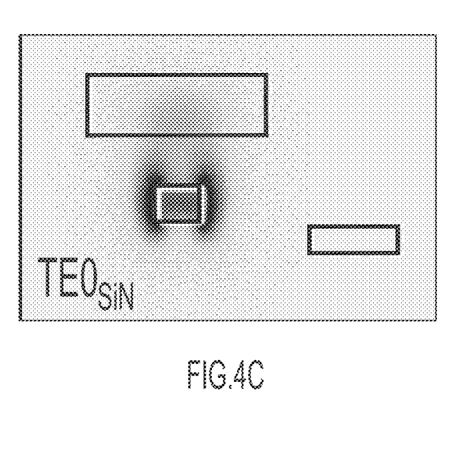

FIGS. 4A-4C show optical power of a TE0 signal in a y-z plane of third optical waveguide 126 of the polarization splitter rotator 100, according to an example embodiment. FIG. 4A shows the TM optical mode that has been transferred from the upper layer to the lower two layers. FIG. 4B shows the TM optical mode from FIG. 4A undergoing a polarization rotation. FIG. 4C shows the fully rotated optical mode (TE polarized) localized to the upper two layers.

Figure 5A:
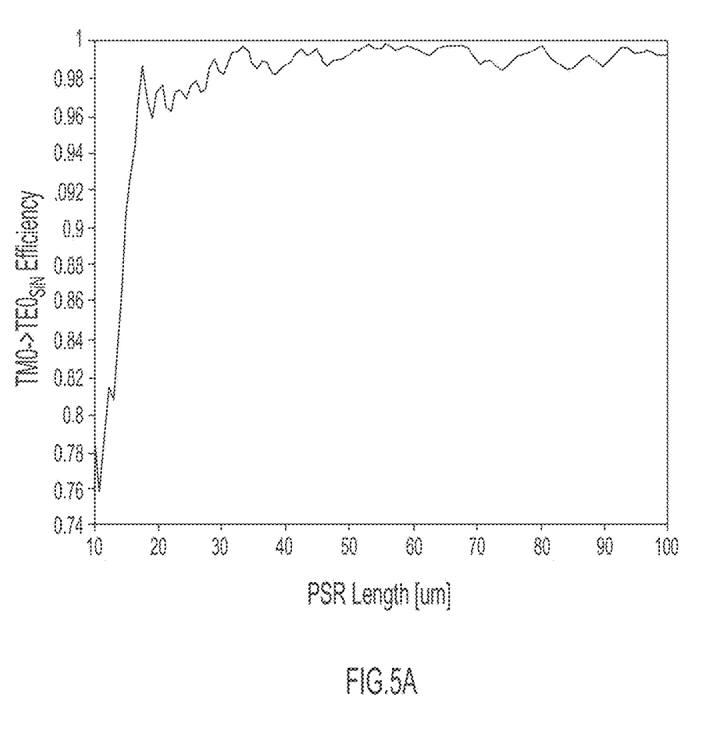
FIG. 5A shows simulated TM0 to TE0$_{SiN}$ transmission versus length of the polarization splitter rotator, according to an example embodiment.

FIG. 5A shows simulated TM0 to $TE0_{SiN}$ transmission versus length of the polarization splitter rotator 100, according to an example embodiment. As can be seen from the graph of FIG. 5A, a length of 50 um for the PSR 100 results in a rotation efficiency of well over 90%, even over 98%.

Figure 5B:
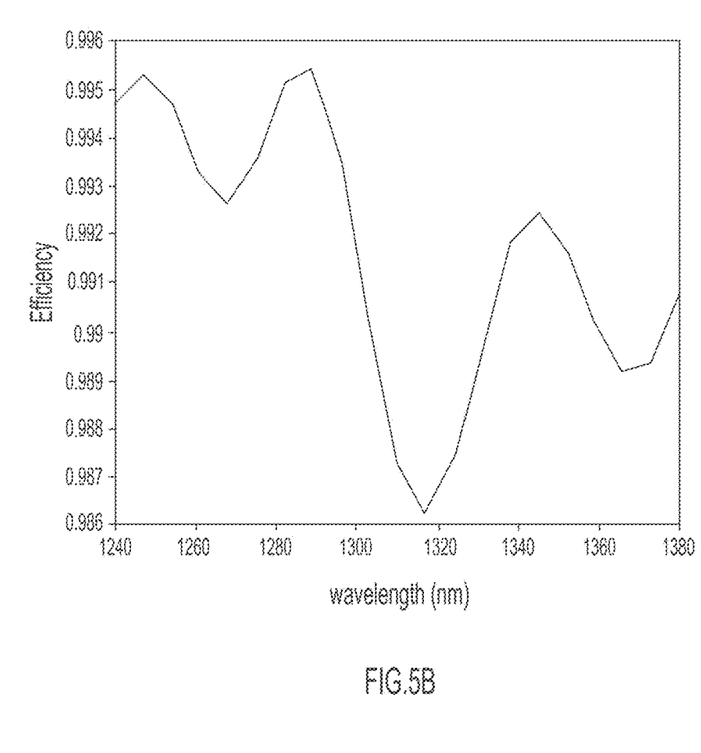
FIG. 5B shows simulated transmission efficiency versus wavelength of the polarization splitter rotator, according to an example embodiment.

FIG. 5B shows simulated transmission efficiency versus wavelength of the polarization splitter rotator 100, according to an example embodiment. Given that 0-band wavelengths (i.e., 1260-1360 nm) are of particular interest in optical fiber communication, the efficiency of PSR 100 depicted in FIG. 5B is more than adequate.

Figure 6A:
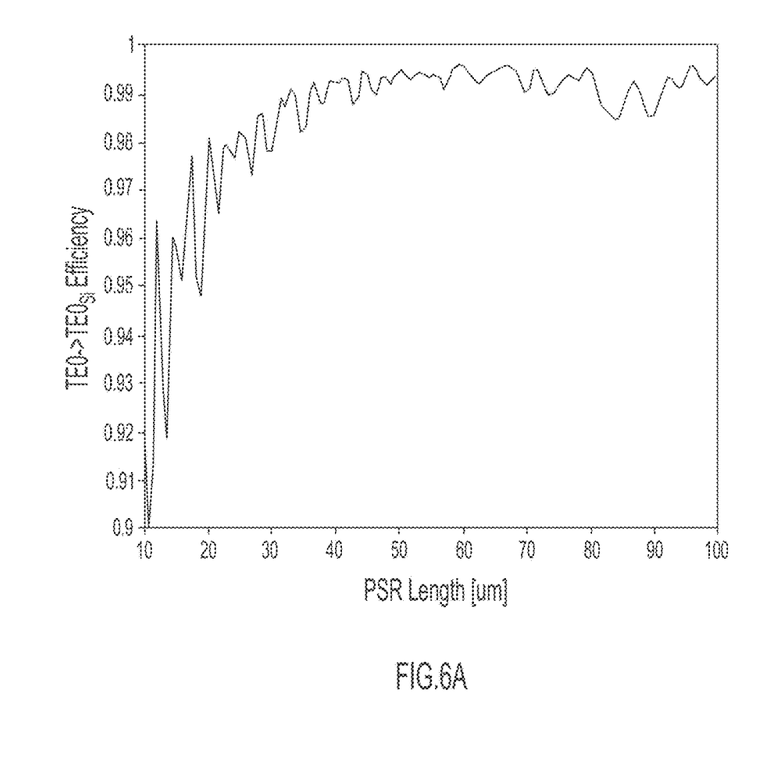
FIG. 6A shows simulated TE0 to TE0$_{Si}$ transmission versus length of the polarization splitter rotator, according to an example embodiment.

FIG. 6A shows simulated TE0 to $TE0_{Si}$ transmission versus length of the polarization splitter rotator 100, according to an example embodiment. As can be seen from the graph of FIG. 6A, a length of 50 um for the PSR 100 results in a transmission of over 98%.

Figure 6B:
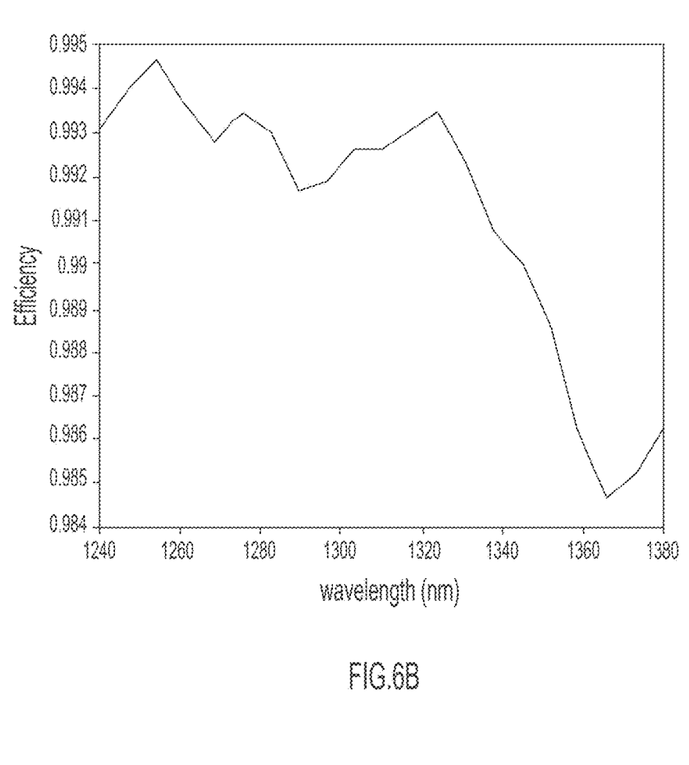
FIG. 6B shows simulated transmission efficiency versus wavelength of the polarization splitter rotator, according to an example embodiment.

FIG. 6B shows simulated transmission efficiency versus wavelength of the polarization splitter rotator 100, according to an example embodiment. As O-band wavelengths are of particular interest in optical fiber communication, the efficiency of PSR 100 depicted in FIG. 5B is more than adequate.

Figure 7:
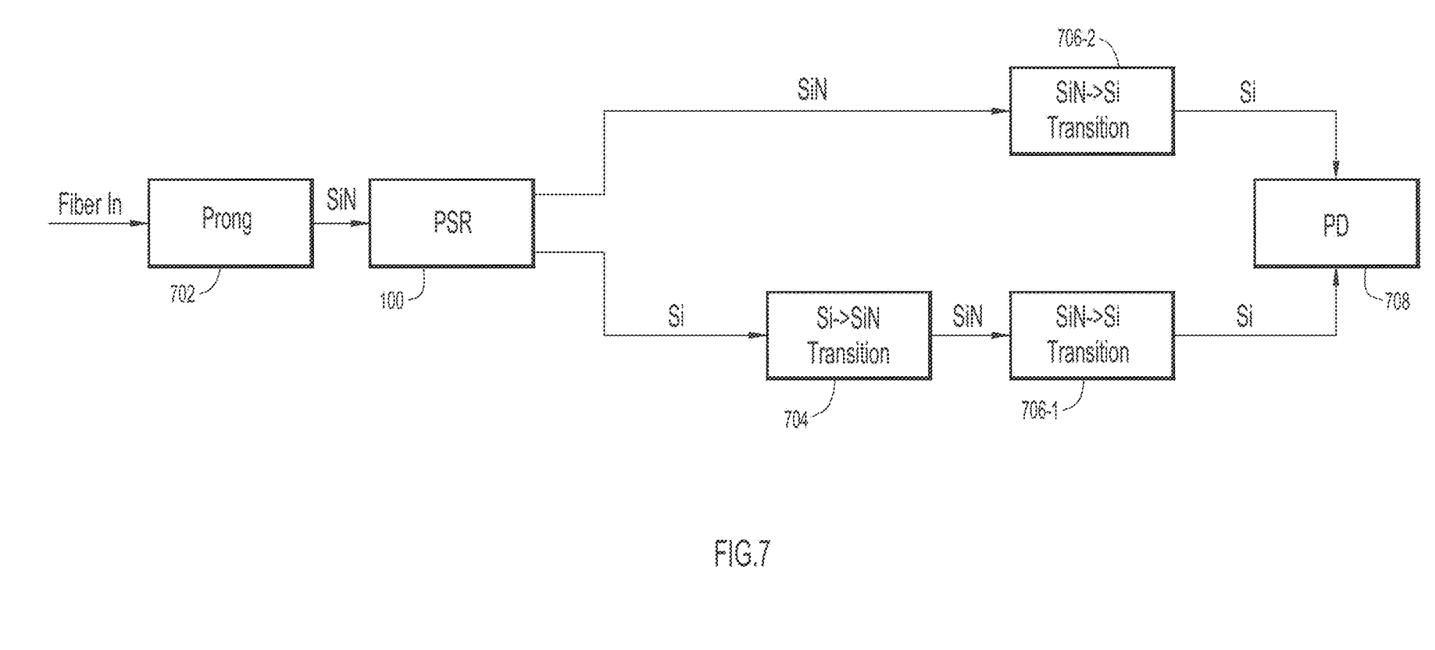
FIG. 7 is block diagram of a receiver use case for the polarization splitter rotator, according to an example embodiment.

FIG. 7 is block diagram of a receiver use case for the polarization splitter rotator 100, according to an example embodiment. As shown, a prong 702 receives a fiber optic cable and delivers a multiplexed optical signal via a SiN waveguide to PSR 100. PSR 100 in turn, rotates and modemuxes the multiplexed optical signal and outputs one optical signal on the Si output (first optical waveguide 122), and another optical signal on the SiN (third optical waveguide 126). The optical signal on the Si output from PSR 100 is provided to Si→SiN transition 704, and an output of Si→SiN transition 704 is provided to SiN→Si transition 706-1. An output of SiN→Si transition 706-1 is supplied to photodetector (PD) 708 of a PIC (not shown). The optical signal on the SiN output of PSR 100 is supplied to SiN→Si transition 706-2. An output of SiN→Si transition 706-2 is supplied to PD 708. As a result, PD 708 receives two optical signals on the same type of waveguide (i.e., Si, in this case). Note that Si→SiN transition 704 and SiN→Si transition 706-1 may not be needed in some implementations.

Figure 8:
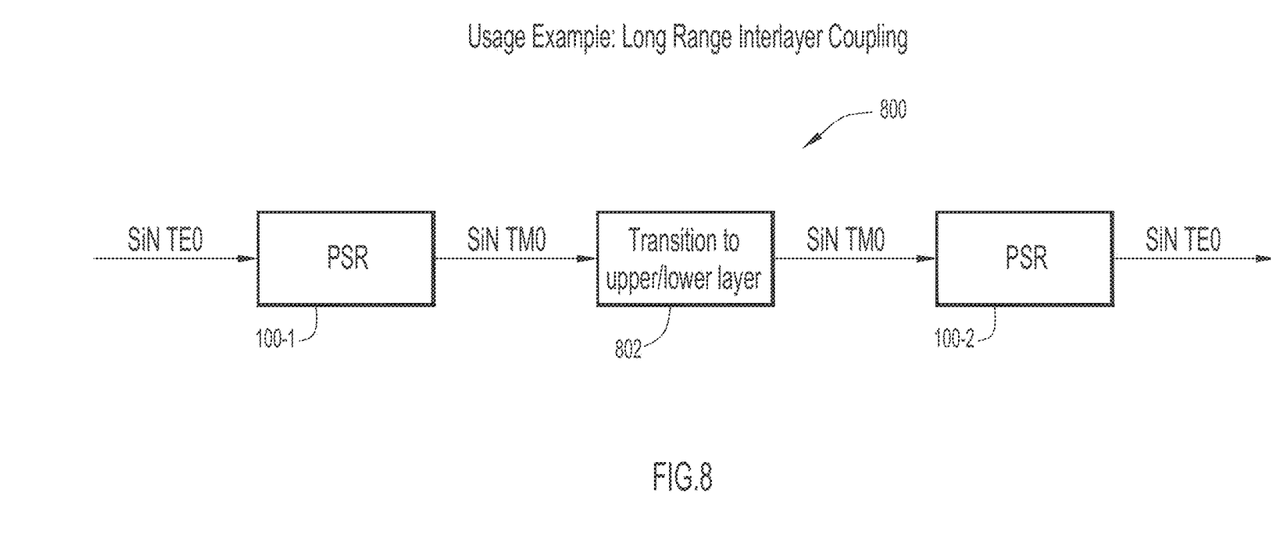
FIG. 8 is a block diagram showing a long range interlayer coupling arrangement use case for the polarization splitter rotator, according to an example embodiment.

FIG. 8 is a block diagram showing a long range interlayer coupling arrangement 800 use case for the polarization splitter rotator 100, according to an example embodiment. As shown a TE0 signal is delivered over SiN to PSR 100-1. PSR 100-1 operates on the TE0 signal such that a TM0 signal is output over SiN. That TM0 signal is delivered to a transition to upper/lower layer component 802, which outputs the same TM0 signal over SiN. That TM0 signal is then supplied to PSR 100-2, which outputs a TE0 signal over SiN.

Figure 9:
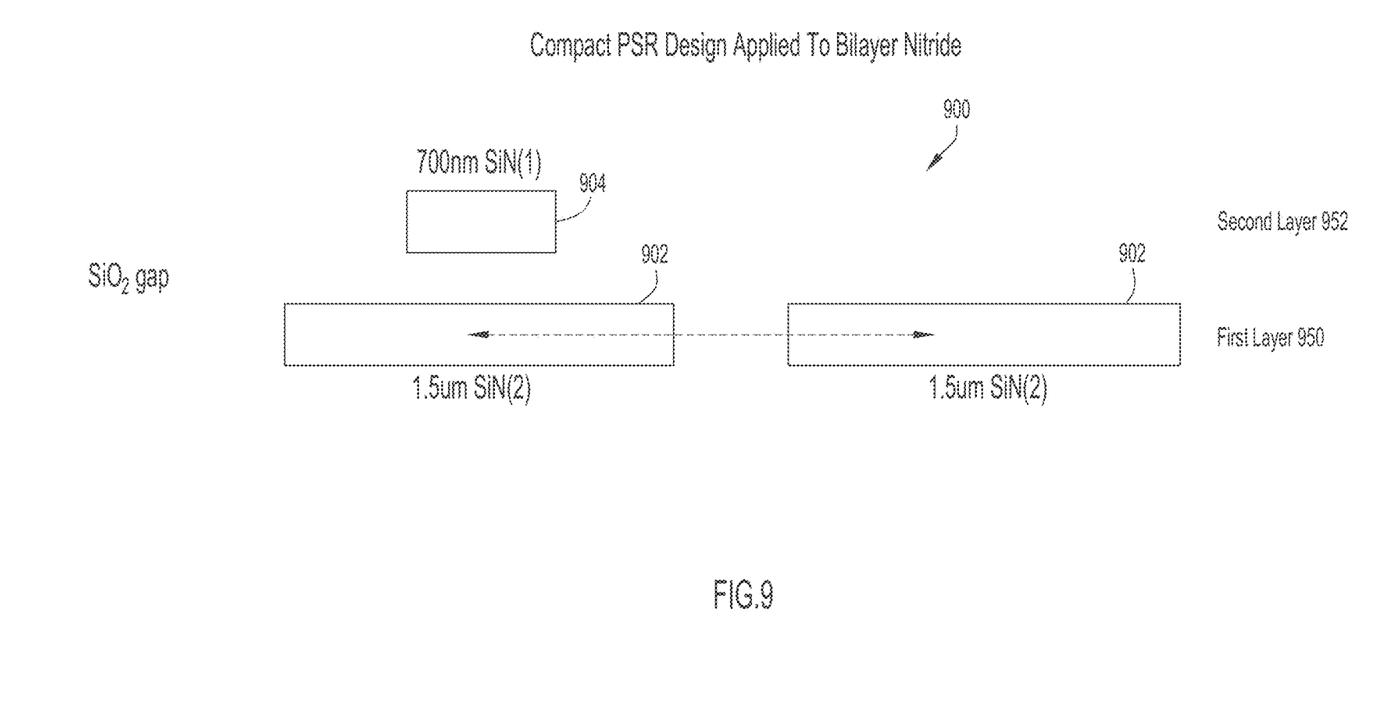
FIG. 9 shows a polarization splitter rotator using a bilayer SiN arrangement, according to an example embodiment.

FIG. 9 shows a bilayer nitride polarization splitter rotator (PSR) 900 using a bilayer nitride arrangement, according to an example embodiment. In this embodiment, bilayer nitride PSR 900 includes two nitride (SiN) waveguides. A first nitride optical waveguide 902 (SiN(2)) is disposed in a first layer 950 of an $SiO_2$ substrate (not shown) and may have a substantially rectangular cross section. The first nitride optical waveguide 902 may have a width of about 1.5 um, and a height of about 250 nm.

A second nitride optical waveguide 904 (SiN(1)) is disposed above the first nitride optical waveguide 902 in a second layer 952 and also may have a substantially rectangular shape in plan view (not shown) and a substantially rectangular cross section. The second nitride optical waveguide 904 may have a width of about 700 nm, and a height of about 250 nm. A gap between the first nitride optical waveguide 902 and the second nitride optical waveguide 904 in a vertical direction may be about 100 nm.

As shown in FIG. 9, and similar to the first optical waveguide 122 of FIG. 1, the first nitride optical waveguide 902 is configured to be translated or curved away from being underneath second nitride optical waveguide 904 over a length of the bilayer nitride PSR 900. At one end of bilayer nitride PSR 900, the first nitride optical waveguide 902 is centered directly underneath second nitride optical waveguide 904, and at another end of PSR 900, the first nitride optical waveguide 902 is translated or curved away from being underneath second nitride optical waveguide 904, with partial overlap over at least a portion of the length of bilayer nitride PSR 900. Second nitride optical waveguide 904 acts as an input for light.

Figure 10:
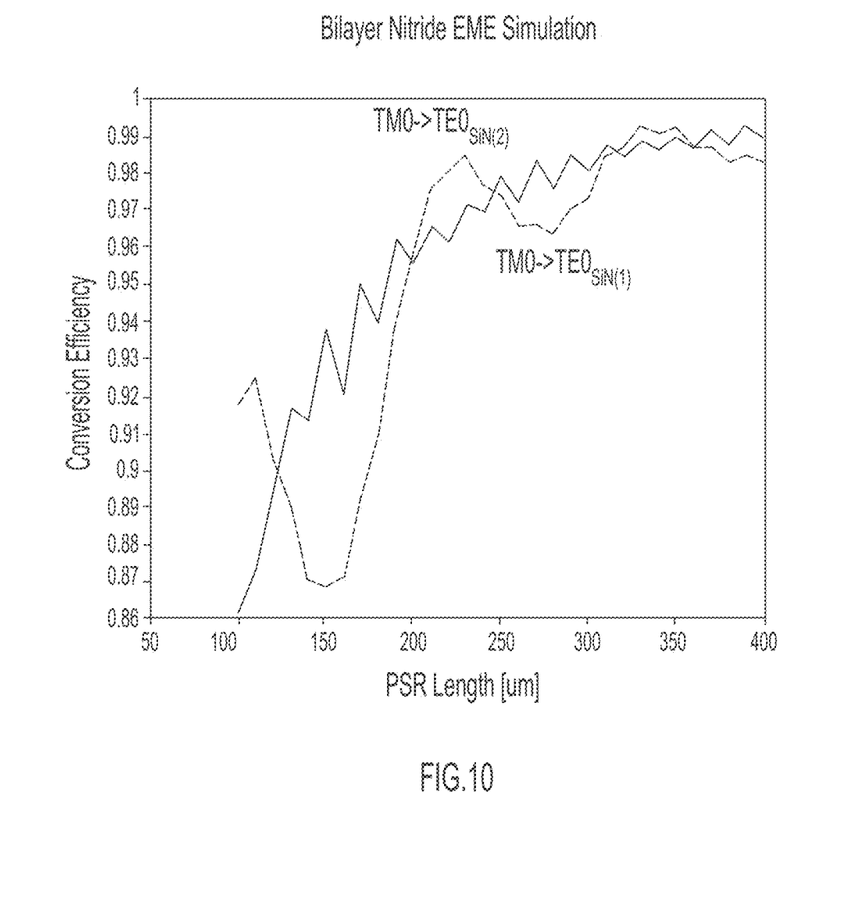
FIG. 10 shows simulated conversion efficiency for TM0 to TE0$_{SiN(1)}$ and TM0 to TE0$_{SiN(2)}$ versus length of the bilayer nitride polarization splitter rotator, according to an example embodiment.

FIG. 10 shows simulated transmission for TM0 to $TE0_{SiN(1)}$ and TM0 to $TE0_{SiN(2)}$ versus length of the bilayer nitride polarization splitter rotator 900, according to an example embodiment. The approximate length of the device would fall between 200 um and 400 um long depending on target transmission metrics.

Figure 11:
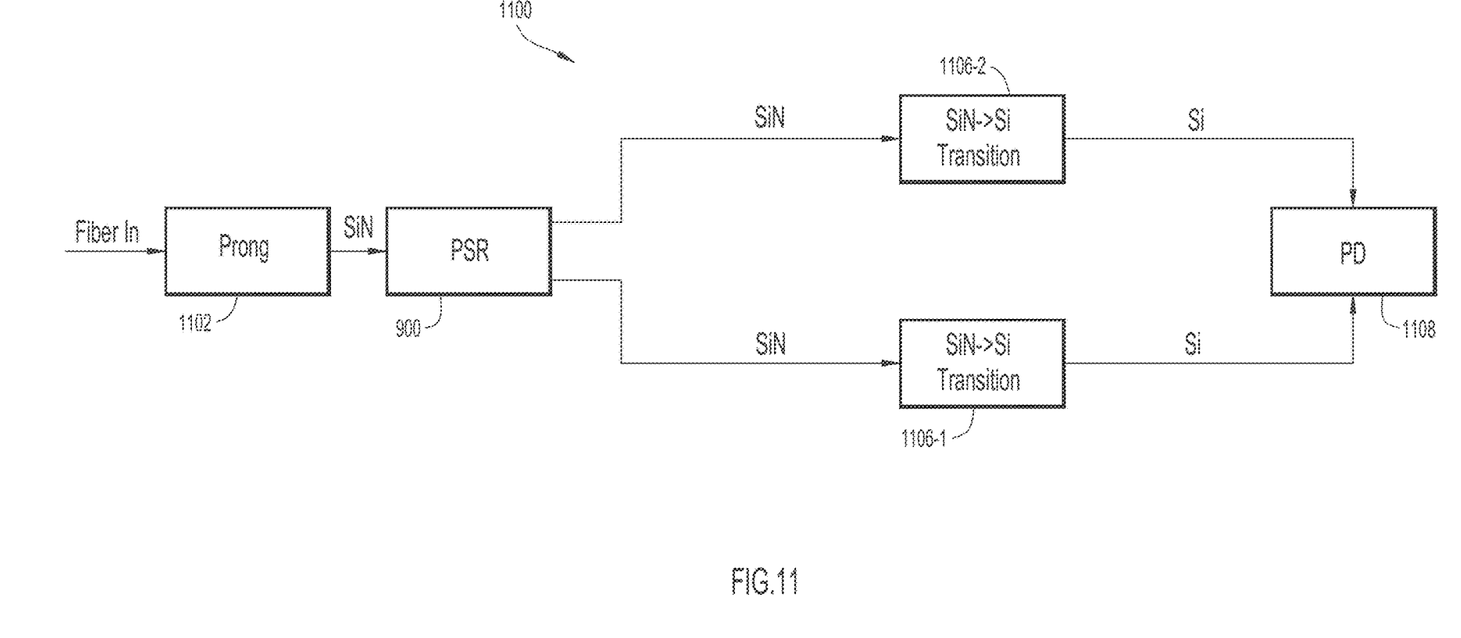
FIG. 11 is block diagram of a receiver use case for the bilayer nitride polarization splitter rotator, according to an example embodiment.

FIG. 11 is block diagram of a receiver 1100 use case for the bilayer nitride polarization splitter rotator 900, according to an example embodiment. As shown, a prong 1102 receives a fiber optic cable and delivers a multiplexed optical signal via a SiN waveguide to bilayer nitride PSR 900. Bilayer nitride PSR 900, in turn, rotates and mode-muxes the multiplexed optical signal and outputs one optical signal on first nitride optical waveguide 902, and another optical signal on second nitride optical waveguide 904. The optical signals output from bilayer nitride PSR 900 are supplied to SiN→Si transitions 1106-1, 1106-2, respectively, and outputs thereof are provided to PD 1108. As a result, PD 1108 receives two optical signals on the same type of waveguide.

Figure 12:
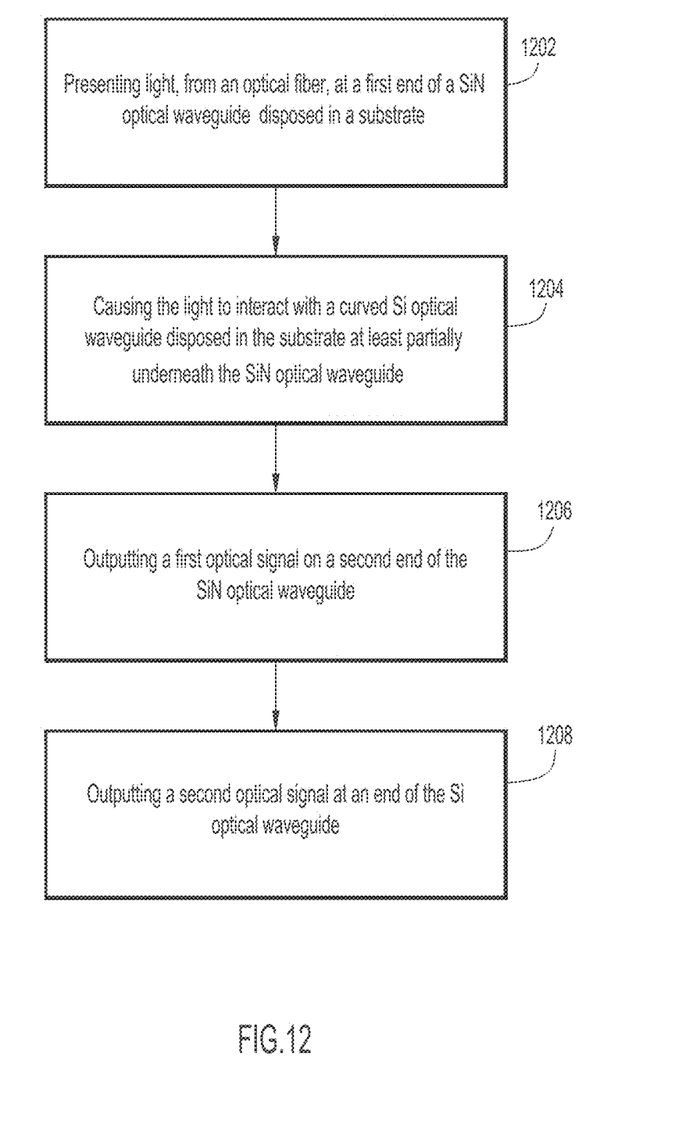
FIG. 12 is a flowchart showing a series of operations for processing light with a polarization splitter rotator, according to an example embodiment.

FIG. 12 is a flowchart showing a series of operations for processing light with a polarization splitter rotator, according to an example embodiment. The series of operations, or method, includes, at 1202 presenting light, from an optical fiber, at a first end of a SiN optical waveguide disposed in a substrate. The method further includes, at 1204, causing the light to interact with a curved Si optical waveguide disposed in the substrate at least partially underneath the SiN optical waveguide. The method still further includes, at 1206, outputting a first optical signal on a second end of the SiN optical waveguide, and, at 1208, outputting a second optical signal at an end of the Si optical waveguide.

Variations and Implementations

Embodiments described herein may include or be part of one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a device is provided and includes a substrate, a first optical waveguide disposed in the substrate on a first layer, the first optical waveguide having a curved portion between a first end of the first optical waveguide and a second end of the first optical waveguide, and a second optical waveguide disposed in the substrate on a second layer, above the first layer, the second optical waveguide having a substantially rectangular shape and longitudinally arranged between the first end of the first optical waveguide and the second end of the first optical waveguide.

The first optical waveguide may be Si, and the second optical waveguide may be SiN (i.e., silicon nitride $Si_3N_4$).

The first optical waveguide and the second optical waveguide may be SiN.

In an embodiment, a third optical waveguide may be disposed on a third layer between the first layer and the second layer, and substantially centered underneath the second optical waveguide. The third optical waveguide may be poly-silicon.

The first end of the first optical waveguide may be disposed entirely underneath the second optical waveguide.

The second end of the first optical waveguide may be translated away from being underneath the second optical waveguide.

In an embodiment, the device may be configured to rotate a polarization of a portion of light input to the second optical waveguide and simultaneously modemux the portion of the light.

The device may have an overall length of the device is about 50 um.

In another embodiment, a device includes a substrate, a first optical waveguide disposed in the substrate on a first layer, the first optical waveguide arranged such that its position translates along an axis perpendicular to an axis extending between a first end of the first optical waveguide and a second end of the first optical waveguide, a second optical waveguide disposed in the substrate on a second layer, above the first layer, the second optical waveguide having a substantially rectangular shape and longitudinally arranged between first the end of the first optical waveguide and the second end of the first optical waveguide, and a third optical waveguide disposed in the substrate between the first optical waveguide and the second optical waveguide.

The first optical waveguide may be comprised of Si, and the second optical waveguide is comprised of SiN (i.e., silicon nitride $Si_3N_4$).

The third optical waveguide may be comprised of poly-silicon.

The first end of the first optical waveguide may be disposed entirely underneath the second optical waveguide.

The second end of the first optical waveguide may be disposed such that it is no longer underneath the second optical waveguide.

In an embodiment, the overall length of the device is about 50 um.

A method is also provided and includes presenting light, from an optical fiber, at a first end of a SiN optical waveguide disposed in a substrate; causing the light to interact with a curved Si optical waveguide disposed in the substrate at least partially underneath the SiN optical waveguide; outputting a first optical signal on a second end of the SiN optical waveguide; and outputting a second optical signal at an end of the Si optical waveguide.

In an embodiment, the second optical signal may be derived from the light by rotating a polarization of a portion of light and simultaneously modemuxing the portion of the light.

The first optical signal may be a first transverse electric optical signal and the second optical signal may be a second transverse electric optical signal.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A device comprising:
   a substrate;
   a first optical waveguide disposed in the substrate on a first layer, the first optical waveguide having a curved portion between a first end of the first optical waveguide and a second end of the first optical waveguide;
   a second optical waveguide disposed in the substrate on a second layer, above the first layer, the second optical waveguide having a substantially rectangular shape and longitudinally, arranged between the first end of the first optical waveguide and the second end of the first optical waveguide; and
   a third optical waveguide disposed on a third layer between the first layer and the second layer, and substantially centered underneath the second optical waveguide,
   wherein a first gap between the first optical waveguide and the third optical waveguide is substantially smaller than a second gap between the second optical waveguide and the third optical waveguide.

2. The device of claim 1, wherein the first optical waveguide is comprised of Si.

3. The device of claim 1, wherein the second optical waveguide is comprised of SiN.

4. The device of claim 1, wherein the first optical waveguide and the second optical waveguide are comprised of SiN.

5. The device of claim 1, wherein the third optical waveguide is comprised of poly-silicon.

6. The device of claim 1, wherein the first end of the first optical waveguide is disposed entirely underneath the second optical waveguide.

7. The device of claim 1, wherein the second end of the first optical waveguide is translated away from being underneath the second optical waveguide.

8. The device of claim 1, wherein the device is configured to rotate a polarization of a portion of light input to the second optical waveguide and simultaneously modemux the portion of the light.

9. The device of claim 7, wherein an overall length of the device is about 50 um.

10. A device comprising:
    a substrate;
    a first optical waveguide disposed in the substrate on a first layer, the first optical waveguide arranged such that its position translates along an axis perpendicular to an axis extending between a first end of the first optical waveguide and a second end of the first optical waveguide;
    a second optical waveguide disposed in the substrate on a second layer, above the first layer, the second optical waveguide having a substantially rectangular shape and longitudinally arranged between the first end of the first optical waveguide and the second end of the first optical waveguide; and
    a third optical waveguide disposed in the substrate between the first optical waveguide and the second optical waveguide, the third optical waveguide extending in a same direction as the second optical waveguide,
    wherein a first gap between the first optical waveguide and the third optical waveguide is substantially smaller than a second gap between the second optical waveguide and the third optical waveguide.

11. The device of claim 10, wherein the first optical waveguide is comprised of Si.

12. The device of claim 10, wherein the second optical waveguide is comprised of SiN.

13. The device of claim 10, wherein the third optical waveguide is comprised of poly-silicon.

14. The device of claim 10, wherein the first end of the first optical waveguide is disposed entirely underneath the second optical waveguide.

15. The device of claim 10, wherein the second end of the first optical waveguide is disposed such that it is no longer underneath the second optical waveguide.

16. The device of claim 10, wherein an overall length of the device is about 50 um.

17. A method comprising:
    presenting light, from an optical fiber, at a first end of a SiN optical waveguide disposed in a substrate;
    causing the light to interact with a curved Si optical waveguide disposed in the substrate at least partially underneath the SiN optical waveguide;
    causing the light to interact with a poly-silicon waveguide disposed between the SiN optical waveguide and the curved Si optical waveguide, wherein a first gap between the poly-silicon optical waveguide and the curved Si optical waveguide is substantially smaller than a second gap between the SiN optical waveguide and the poly-silicon optical waveguide;
    outputting a first optical signal on a second end of the SiN optical waveguide; and outputting a second optical signal at an end of the curved Si optical waveguide.

18. The method of claim 17, wherein the second optical signal is derived from the light by rotating a polarization of a portion of light and simultaneously modemuxing the portion of the light.

19. The method of claim 17, wherein the first optical signal is a first transverse electric optical signal and the second optical signal is a second transverse electric optical signal.

20. The device of claim 1, wherein the first gap is about 5 nm, and the second gap is about 170 nm.

* * * * *